United States Patent
Lee et al.

(10) Patent No.: US 8,525,807 B2
(45) Date of Patent: Sep. 3, 2013

(54) FLAT DISPLAY, TOUCH DEVICE AND TOUCH DETECTING METHOD

(75) Inventors: Yuet-Ping Lee, Hsin-Chu (TW);
Seok-Lyul Lee, Hsin-Chu (TW);
Yao-Jen Hsieh, Hsin-Chu (TW);
Heng-Sheng Chou, Hsin-Chu (TW);
Pang-Chiang Chia, Hsin-Chu (TW);
Weng-Bing Chou, Hsin-Chu (TW);
Chao-Chen Wang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 279 days.

(21) Appl. No.: 12/827,551

(22) Filed: Jun. 30, 2010

(65) Prior Publication Data
US 2011/0074711 A1    Mar. 31, 2011

(30) Foreign Application Priority Data
Sep. 30, 2009   (TW) .............................. 98133232 A

(51) Int. Cl.
*G06F 3/041*    (2006.01)
*G09G 3/36*    (2006.01)

(52) U.S. Cl.
USPC .............................................. 345/173; 345/87

(58) Field of Classification Search
None
See application file for complete search history.

(56) References Cited

U.S. PATENT DOCUMENTS

| | | | |
|---|---|---|---|
| 4,651,148 A | 3/1987 | Takeda et al. | |
| 6,181,310 B1 | 1/2001 | Nomura | |
| 2010/0156819 A1* | 6/2010 | Takahashi et al. | 345/173 |

* cited by examiner

*Primary Examiner* — Joseph Haley
*Assistant Examiner* — Emily Frank
(74) *Attorney, Agent, or Firm* — WPAT, PC; Justin King

(57) ABSTRACT

A touch device is disposed on a substrate having a plurality of scan lines. The touch device comprises a plurality of readout lines and a plurality of sensors. The readout lines and the scan lines are intersected with each other, and the sensors are electrically coupled to the corresponding scan lines and the corresponding readout lines respectively. A scan signal is introduced into the scan lines in sequence to control whether turning on the sensors, and the scan signal comprises at least one first turn-on pulse and a second turn-on pulse to simultaneously turn on at least two sensors which are electrically coupled to different scan lines.

10 Claims, 5 Drawing Sheets

FLAT DISPLAY, TOUCH DEVICE AND TOUCH DETECTING METHOD

CROSS-REFERENCE TO RELATED APPLICATIONS

This application is based upon and claims the benefit of priority from the prior Taiwan Patent Application No. 098133232, filed Sep. 30, 2009, the entire contents of which are incorporated herein by reference.

BACKGROUND

1. Technical Field

The present invention relates to the touch detecting field, and more particularly to a flat display with touch function, a touch device and a touch detecting method thereof.

2. Description of the Related Art

With the development of the technology, since flat display (such as, liquid crystal display) has many advantages, such as high image quality, little size, light weight and wide application range, etc., it is widely applied into various consumption, such as mobile phone, notebook computer, desktop computer and television, etc. Thus the flat display has gradually substituted conventional cathode ray tube (CRT) display to be a main trend of the display.

Touch device is configured for providing a new human-machine interface, and it is more intuitional in use and more suitable for the human nature. If the touch device is integrated with the flat display together, the flat display can have a touch function, and it is a development trend of the flat display.

Refer to FIGS. 1 and 2, wherein FIG. 1 is a schematic view of a conventional flat display with touch function, and FIG. 2 is a timing diagram of scanning signals of the flat display as shown in FIG. 1. The flat display 10 may be a liquid crystal display (LCD), and include a thin-film transistor (TFT) substrate 11, a color filter (CF) substrate (not shown) opposite to the TFT substrate 11, and a liquid crystal layer sandwiched between the two substrates. In addition, the flat display 10 further includes scan lines $s(n-4)$~$s(n+4)$, data lines $d(n-4)$~$d(n+4)$, pixel transistors 12, pixel electrodes 13, sensors 15 and readout lines $r(n-1)$~$r(n+1)$, which are disposed on the TFT substrate 11.

The scan lines $s(n-4)$~$s(n+4)$ and the data lines $d(n-4)$~$d(n+4)$ are intersected with each other to divide the flat display 10 into a plurality of pixel regions (not shown). Each of the pixel regions has a pixel transistor 12 and a pixel electrode 13 disposed therein respectively. Furthermore, each of the pixel transistors 12 is electrically coupled to a corresponding one of the scan lines $s(n-4)$~$s(n+4)$ and a corresponding one of the data lines $d(n-4)$~$d(n+4)$ respectively, and each of the pixel electrodes 13 is electrically coupled to a corresponding one of the pixel transistors 12. A scan signal Scan_1 is introduced into the scan lines $s(n-4)$~$s(n+4)$ in sequence to determine whether turning on the pixel transistors 12 electrically coupled to the scan lines $s(n-4)$~$s(n+4)$. The scan signal Scan_1 includes a turn-on pulse DP to turn on the pixel transistors 12 electrically coupled to the scan lines $s(n-4)$~$s(n+4)$ in sequence. That is, when the turn-on pulse DP of the scan signal Scan_1 is introduced into the scan lines $s(n-4)$~$s(n+4)$ in sequence, the pixel transistors 12 electrically coupled to the scan lines $s(n-4)$~$s(n+4)$ are turned on in sequence, such that data signals in the data lines $d(n-4)$~$d(n+4)$ are transmitted to the corresponding pixel electrodes 13 to make the flat display 10 display an image.

In addition, the sensors 15 are distributed on the TFT substrate 11, and each of the sensors 15 may correspond to at least one of the pixel regions respectively. For example, in the flat display 10 as shown in FIG. 1, each of the sensors 15 corresponds to a region A with 4×4 pixel regions respectively. That is, a sensor 15 is disposed every 4 scan lines and every 4 data lines, and the sensors 15 are electrically coupled to the scan lines $s(n-4)$, sn, $s(n+4)$ and the readout lines $r(n-1)$, rn, $r(n+1)$ respectively. When the turn-on pulse DP of the scan signal Scan_1 is introduced into the scan lines $s(n-4)$, sn, $s(n+4)$ in sequence, the sensors 15 electrically coupled to the scan lines $s(n-4)$, sn, $s(n+4)$ are turned on sequentially to detect whether corresponding regions are touched and generate corresponding detect signals. Then, the detect signals generated by the sensors 15 are transmitted to a detect circuit 17 by the readout lines $r(n-1)$, rn, $r(n+1)$ and stored in the detect circuit 17.

An amount of the detect signals stored in the detect circuit 17 is determined by a density of the sensors 15 disposed in the flat display 10, and the density of the sensors 15 is related to a resolution of the flat display 10. For example, if the resolution of the flat display 10 is 240×320 (that is, the flat display 10 includes 240 data lines and 320 scan lines to divide the flat display 10 into 240×320 pixel regions), the density of the sensors 15 is 60×80, and the amount of the detect signals stored in the detect circuit 17 after a scan is also 60×80.

However, since the region A with 4×4 pixel regions corresponding to each of the sensors 15 is large, the density of the sensors 15 distributed on the TFT substrate 11 is low. Therefore, if a region touched by users, such as a region B, is distant from a corresponding sensor $15(n-4)$, thus the sensor $15(n-4)$ is difficult to detect whether the region A with 4×4 pixel regions is touched and the touch-detecting capability of the flat display 10 is low. For improving the touch-detecting capability of the flat display 10, it needs to increase the amount of the sensors 15 and improve the density of the sensors 15. Therefore the amount of the detect signals stored in the detect circuit 17 should be increased correspondingly, and the store capability of the detect circuit 17 should be improved. However, it is very difficult to improve the store capability of the detect circuit 17, thus the amount of the sensors 15 cannot be greatly increased, and the touch-detecting capability of the flat display 10 also cannot be greatly improved.

BRIEF SUMMARY

The present invention relates to a flat display with touch function, which can improve a touch-detecting capability of the flat display without increasing a storage capacity of a detect circuit.

The present invention also relates to a touch device, which can improve a touch-detecting capability thereof without increasing a storage capacity of a detect circuit.

The present invention further relates to a touch-detecting method, which can improve a touch-detecting capability thereof without increasing a storage capacity of a detect circuit.

A flat display with touch function in accordance with an exemplary embodiment of the present invention comprises a plurality of scan lines, a plurality of data lines, a plurality of pixel transistors, a plurality of pixel electrodes, a plurality of readout lines and a plurality of sensors. The data lines and the scan lines are intersected with each other to divide the flat display into a plurality of pixel regions. The pixel transistors are disposed in the pixel regions respectively and are electrically coupled to the corresponding scan lines and the corresponding data lines respectively. The pixel electrodes are disposed in the pixel regions respectively, and each of the pixel electrodes is electrically coupled to a corresponding one of the pixel transistors respectively. The readout lines and the scan lines are intersected with each other, and the sensors are electrically coupled to the corresponding scan lines and the corresponding data lines respectively. A scan signal is introduced into the scan lines in sequence to control whether turning on the sensors, and the scan signal comprises at least one first turn-on pulse and a second turn-on pulse to simultaneously turn on at least two sensors. The at least two sensors which are simultaneously turned on, are electrically coupled to different scan lines.

A touch device in accordance with another exemplary embodiment of the present invention is disposed on a substrate having a plurality of scan lines. The touch device comprises a plurality of readout lines and a plurality of sensors. The readout lines and the scan lines are intersected with each other, and the sensors are electrically coupled to the corresponding scan lines and the corresponding readout lines respectively. A scan signal is introduced into the scan lines in sequence to control whether turning on the sensors, and the scan signal comprises at least one first turn-on pulse and a second turn-on pulse to simultaneously turn on at least two sensors. The at least two sensors, which are simultaneously turned on, are electrically coupled to different scan lines.

In an exemplary embodiment of the present invention, the flat display and the touch device further employ the readout lines to charge the sensors to a predetermined voltage. Furthermore, when the second turn-on pulse is introduced in the scan lines in sequence, the data lines transmit data signals to the corresponding pixel electrodes such that the flat display displays an image.

In an exemplary embodiment of the present invention, the flat display and the touch device further comprises a detect circuit electrically coupled to the readout lines for reading detect signals generated from the sensors.

A touch-detecting method in accordance with other exemplary embodiment of the present invention is adapted into the touch device. The touch-detecting method comprises: introducing a scan signal into the scan lines in sequence to control whether turning on the sensors, wherein the scan signal comprises at least one first turn-on pulse and a second turn-on pulse to simultaneously turn on different sensors electrically coupled to different scan lines; and detecting detect signals generated from the different sensors, which are simultaneously turned on, to determine whether having a touch operation.

In summary, the flat display, the touch device and the touch-detecting method of the present invention adjust the scan signal in the scan lines to make the scan signal have at least one first turn-on pulse and a second turn-on pulse, such that the different sensors electrically coupled to the different scan lines are simultaneously turned on. Therefore, the present invention can increase the density of the sensors without increasing the storage capacity of the detect circuit such that the touch-detecting capability thereof can be improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present flat display, touch device and touch detecting method in detail. The following description is given by way of example, and not limitation.

Figure 1:
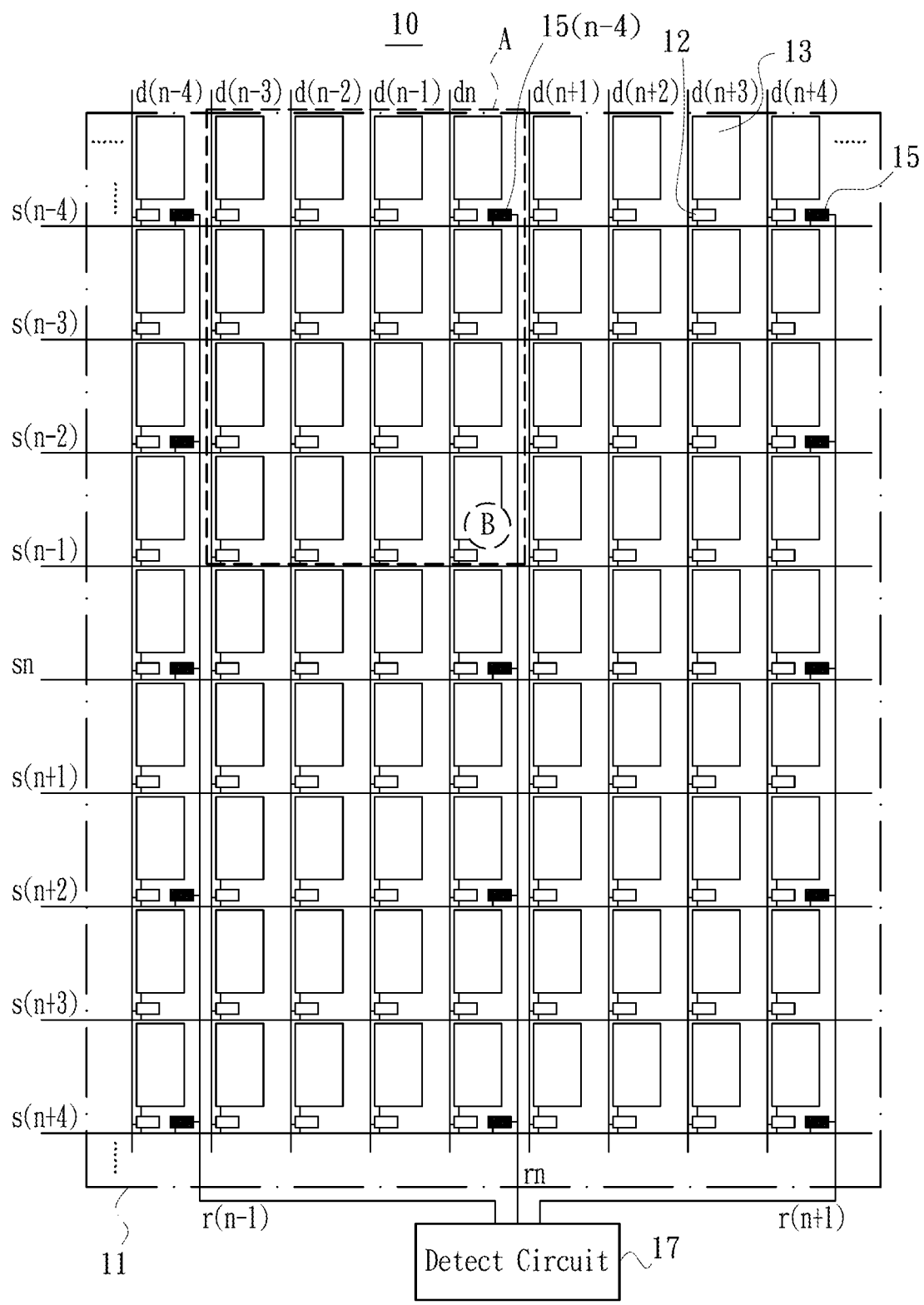
FIG. 1 is a schematic view of a conventional flat display with touch function.
Figure 2:
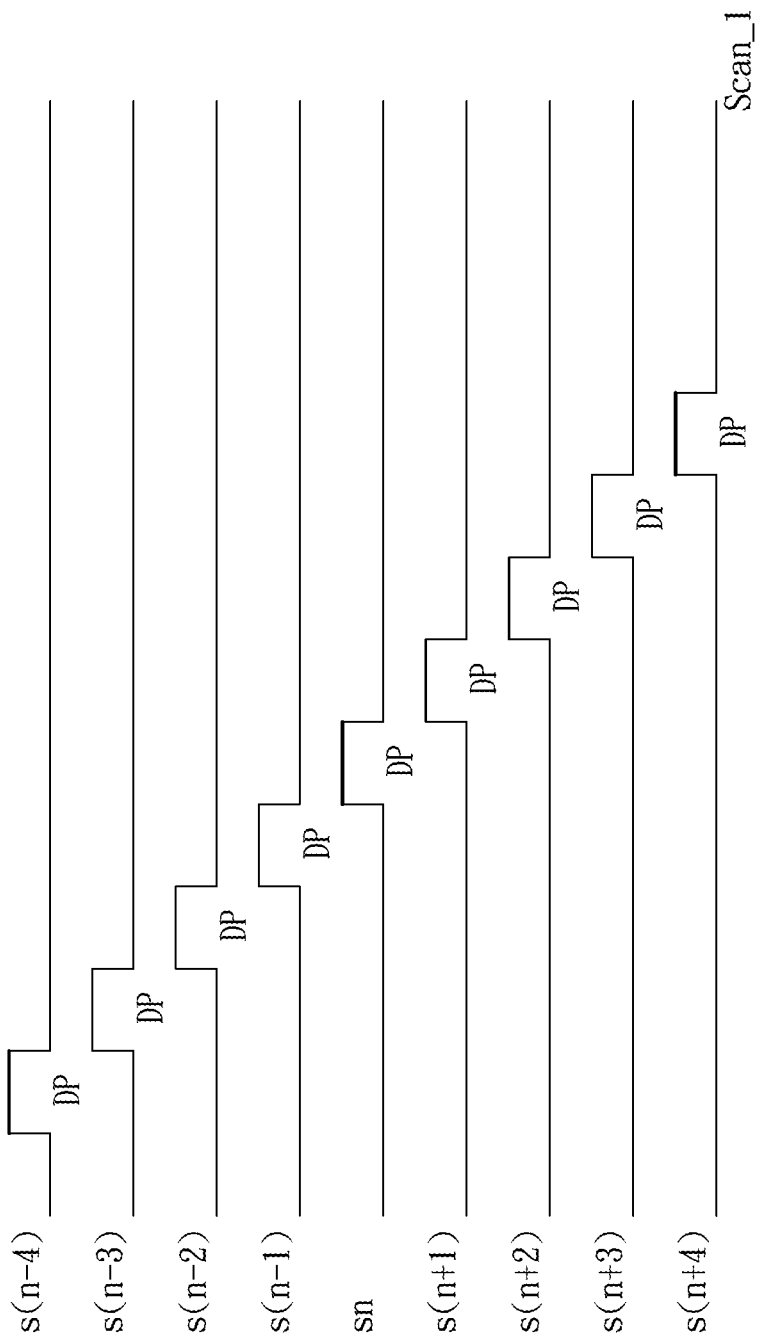
FIG. 2 is a timing diagram of a scan signal of the flat display as shown in FIG. 1.
Figure 3:
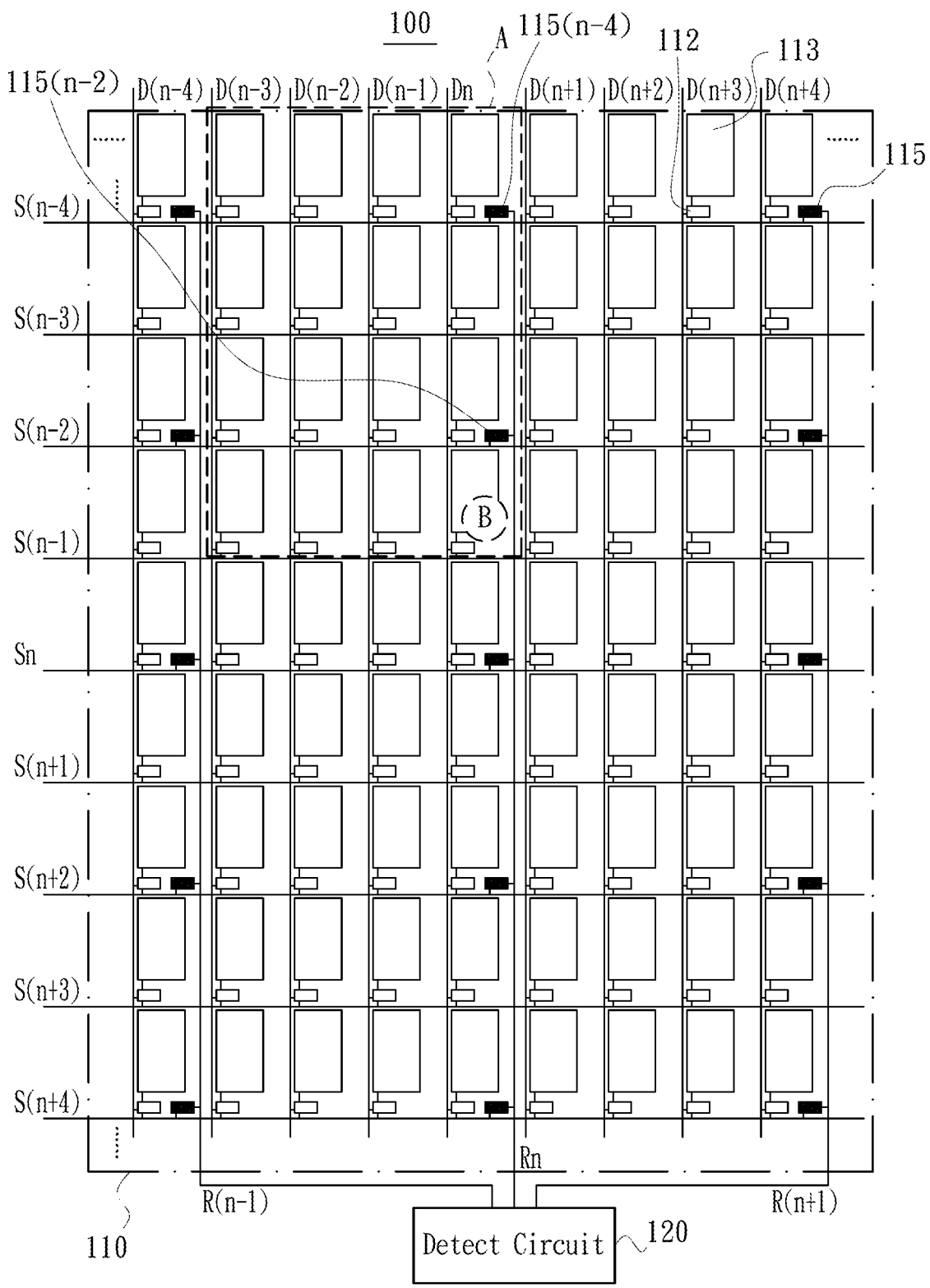
FIG. 3 is a schematic view of a flat display with touch function in accordance with an exemplary embodiment of the present invention.
Figure 4:
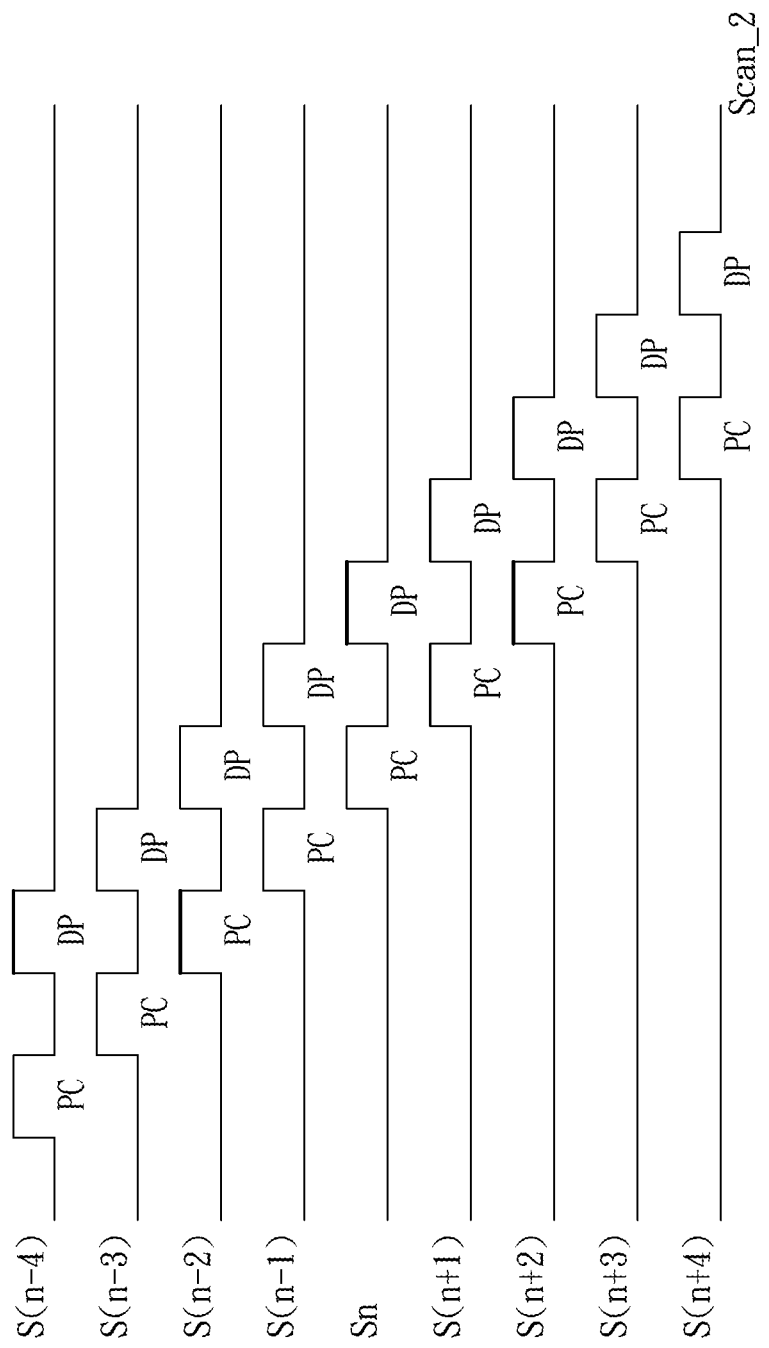
FIG. 4 is a timing diagram of a scan signal of the flat display as shown in FIG. 3.

Refer to FIGS. 3 and 4, wherein FIG. 3 is a schematic view of a flat display with touch function in accordance with an exemplary embodiment of the present invention, and FIG. 4 is a timing diagram of a scan signal of the flat display as shown in FIG. 3. The flat display 100 disclosed in the exemplary embodiment of the present invention is similar with the flat display 10 as shown in FIG. 1. The flat display 100 also may be a liquid crystal display, which includes a thin film transistor (TFT) substrate 110, scan lines S(n−4)~S(n+4), data lines D(n−4)~D(n+4), pixel transistors 112 and pixel electrodes 113. In addition, the flat display 100 further includes sensors 115, readout lines R(n−1)~R(n+1) and a detect circuit 120, which are configured for composing a touch device.

The flat display 100 disclosed in the exemplary embodiment of the present invention is similar with the flat display 10 as shown in FIG. 1, except that a density of the sensors 115 distributed on the TFT substrate 110 is different. In the exemplary embodiment, not only the scan lines S(n−4), Sn, S(n+4) are electrically coupled to the sensors 115 respectively, but also the scan lines S(n−2) and S(n+2) are also electrically coupled to the sensors 115 respectively. That is, the flat display 100 of the exemplary embodiment dispose a sensor 115 every 2 scan lines and every 4 data lines. Therefore, if a resolution of the flat display 100 is 240×320, the density of the sensors 115 is 60×160.

Refer to FIG. 4, the scan signals Scan_2 of the exemplary embodiment of the present invention includes a first turn-on pulse PC and a second turn-on pulse DP respectively. The first turn-on pulse PC and the second turn-on pulse DP are both configured for turning on the pixel transistors 112 and the sensors 115 electrically coupled to the scan lines. When the second turn-on pulse DP is introduced into the scan lines S(n−4)~S(n+4) in sequence, the flat display 100 employs the data lines D(n−4)~D(n+4) to transmit data signals to the corresponding pixel electrodes 113 for making the flat display 100 display an image. As shown in FIG. 4, when the second turn-on pulse DP of the scan signal Scan_2 is introduced in the scan line S(n−4), the first turn-on pulse PC of the scan signal Scan_2 is introduced in the scan line S(n−2). At this moment, the sensors 115 electrically coupled to the scan lines S(n−4) and S(n−2) are turned on. Similarly, when the second turn-on pulse DP of the scan signal Scan_2 is introduced in the scan line Sn, the first turn-on pulse PC of the scan signal Scan_2 is introduced in the scan line S(n+2). At this moment, the sensors electrically coupled to the scan lines Sn and S(n+2) are turned on. Therefore, a region A with 4×4 pixel regions has two sensors 115 to simultaneously detect whether the region A with 4×4 pixel regions is touched and generate a detect signal. The detect signal is read to the detect circuit 120 via the readout lines R(n−1)~R(n+1) and stored in the detect circuit 120.

Since the region A with 4×4 pixel regions in the flat display 100 of the exemplary embodiment of the present invention has the two sensors 115 to simultaneously detect whether the region A with 4×4 pixel regions is touched, a region B touched by users is near to another sensor 115(n−2) in the region A with 4×4 pixel regions, and can be detected by the sensor 115(n−2) even if the region B touched by users is far from the sensor 115(n−4) in the region A with 4×4 pixel regions and is difficult to be detected by the sensor 115(n−4). Therefore, the present invention can increase the density of the sensors 115, and improve the touch-detecting capability of the flat display 10.

In additional, since the two sensors 115 in the region A with 4×4 pixel regions are simultaneously turned on and the two sensors 115(n−4) and 115(n−2) employs a same readout line Rn to transmit detect signals thereof, the two sensors 115(n−4) and 115(n−2) only transmit a same detect signal to the detect circuit 120. For example, before the first turn-on pulse PC and the second turn-on pulse DP of the scan signal Scan_2 are transmitted to the sensors 115, the sensors 115 are charged to a predetermined voltage by the readout lines R(n−1)~R(n+1). When the sensor 115(n−2) detects the region B is touched, the sensor 115(n−2) is discharged (generally being discharged to a common voltage) by the press of a finger of the user or a touch pen. Therefore, even if the predetermined voltage on another sensor 115(n−4) is not discharged, the predetermined voltage on the sensor 115(n−4) is transmitted to the sensor 115(n−2) via the readout line Rn to be discharged. That is, the predetermined voltages on the sensors 115(n−2) and 115(n−4) are both pulled down to a voltage potential, and then the voltage potential is read by the detect circuit 120 via the readout line Rn and is stored in the detect circuit 120. Therefore, after scanning the flat display 100 disclosed in the exemplary embodiment of the present invention, the amount of the detect signals stored in the detect circuit 120 is not increased, and is still 60×80. That is, the flat display 100 can increase the density of the sensors 115 based on not increasing the storage capacity of the detect circuit 120, and improve the touch-detecting capability of the flat display 100.

It is obvious for persons skilled in the art that the scan signal Scan_2 of the present invention also can includes a plurality of first turn-on pulses PC and a second turn-on pulse DP to simultaneously turn on different sensors electrically coupled to at least two different scan lines, for further increase the density of the sensors on the flat display and improving the touch-detecting capability of the flat display.

In summary, the touch device of the present invention which is mainly composed of the sensors 115, is disposed on the substrate 110 having the plurality of scan lines S(n−4)~S(n+4). The touch device employs the scan lines S(n−4), S(n−2), Sn, S(n+2) and S(n+4) originally disposed on the flat display 100 to transmit the scan signal Scan_2 for controlling whether turn on the sensors electrically coupled to the scan lines S(n−4), S(n−2), Sn, S(n+2) and S(n+4), and adjusts the scan signal Scan_2 to simultaneously turn on the sensors 115 electrically coupled to different scan lines. Therefore, the touch device of the present invention can be integrated with the flat display 100 to make the flat display 100 have the touch function. Furthermore, the present invention can increase the density of the sensors 115 based on not increasing the storage capacity of the detect circuit 120 to improve the touch-detecting capability of the flat display 100. In addition, it should be noted that, the touch device of the present invention which is mainly composed by the sensors 115, also can be applied into other-type flat display, such as organic light-emitting device (OLED) or flexible display, etc., except being applied into the liquid crystal display described in the above description. If the flat display has a plurality of scan lines, the touch device of the present invention can be applied into the flat display to integrate the touch device with the flat display together.

Figure 5:
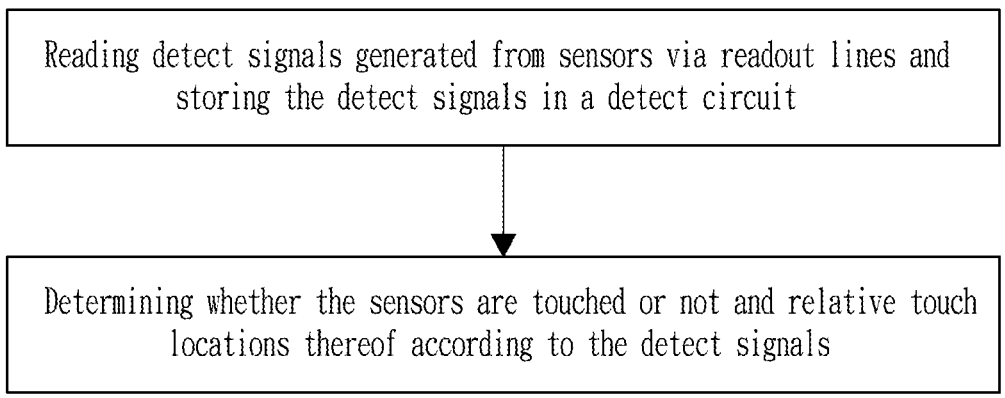
FIG. 5 is a flow chart of a touch-detecting method in accordance with an exemplary embodiment of the present invention.

In addition, the present invention also relates to a touch-detecting method which is configured for driving the flat display as shown in FIG. 3. Refer to FIG. 5, which is a flow chart of the touch-detecting method. The touch-detecting method includes: introducing the scan signal Scan_2 into the scan lines S(n−4)~S(n+4) to control whether turning on the sensors 115, wherein the scan signal Scan_2 includes at least one first turn-on pulse and a second turn-on pulse to simultaneously turn on different sensors electrically coupled to different scan lines; and detecting detect signals generated from the different sensors which are simultaneously turned on, to determine whether having a touch operation.

The step of detecting the detect signals generated from the different sensors which are simultaneously turned on to determine whether having the touch operation includes: reading the detect signals generated from the sensors via the readout lines and storing the detect signals in the detect circuit; and determining whether the sensors are touched or not and relative touch locations thereof according to the detect signals. In addition, the touch-detecting method further includes employing the readout lines to charging the sensors to a predetermined voltage.

In summary, the flat display with touch function, the touch device and the touch-detecting method of the present invention adjust the scan signal in the scan lines to make the scan signal have at least one first turn-on pulse and a second turn-on pulse, such that the different sensors electrically coupled to the different scan lines are simultaneously turned on. Therefore, the present invention can increase the density of the sensors based on not increasing the storage capacity of the detect circuit, to improve the touch-detecting capability thereof.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flat display with touch function, comprising:
a plurality of scan lines;
a plurality of data lines intersecting with the scan lines to divide the flat display into a plurality of pixel regions;
a plurality of pixel transistors disposed in the pixel regions respectively, and each of the pixel transistors being electrically coupled to a corresponding one of the scan lines and a corresponding one of the data lines;
a plurality of pixel electrodes disposed in the pixel regions respectively, each of the pixel electrodes being electrically coupled to a corresponding one of the pixel transistors;
a plurality of readout lines intersecting with the scan lines; and
a plurality of sensors electrically coupled to the corresponding scan lines and the corresponding readout lines respectively;

wherein a scan signal is introduced into the scan lines in sequence to control whether turning on the sensors, the scan signal comprises at least one first turn-on pulse and a second turn-on pulse to simultaneously turn on at least two of the sensors, and the at least two of the sensors which are turned on simultaneously are electrically coupled to different scan lines.

2. The flat display with touch function as claimed in claim 1, wherein the readout lines are further configured for charging the sensors to a predetermined voltage.

3. The flat display with touch function as claimed in claim 1, wherein when the second turn-on pulse is introduced into the scan lines in sequence, the data lines transmit data signals to the corresponding pixel electrodes such that the flat display displays an image.

4. The flat display with touch function as claimed in claim 1, further comprising:
a detect circuit electrically coupled to the readout lines to read detect signals generated from the sensors.

5. A touch device disposed on a substrate, the substrate having a plurality of scan lines, and the touch device comprising:
a plurality of readout lines intersecting with the scan lines; and
a plurality of sensors electrically coupled to the corresponding scan lines and the corresponding readout lines respectively;
wherein a scan signal is introduced into the scan lines in sequence to control whether turning on the sensors, the scan signal comprises at least one first turn-on pulse and a second turn-on pulse to simultaneously turn on different sensors electrically coupled to different scan lines.

6. The touch device as claimed in claim 5, wherein the readout lines are further configured for charging the sensors to a predetermined voltage.

7. The touch device as claimed in claim 5, further comprising:
a detect circuit electrically coupled to the readout lines to read detect signals generated from the sensors.

8. A touch-detecting method adapted into a touch device, the touch device being disposed on a substrate having a plurality of scan lines, the touch device comprising a plurality of readout lines and a plurality of sensors, the readout lines intersecting with the scan lines, the sensors being electrically coupled to the corresponding scan lines and the corresponding readout lines respectively, the touch-detecting method comprising:
introducing a scan signal into the scan lines in sequence to control whether turning on the sensors, wherein the scan signal comprises at least one first turn-on pulse and a second turn-on pulse to simultaneously turn on different sensors electrically coupled to different scan lines; and
detecting a detect signal generated from the different sensors which are turned on simultaneously to determine whether having an touch operation.

9. The touch-detecting method as claimed in claim 8, wherein the touch device further comprises a detect circuit electrically coupled to the readout lines, and the step of detecting the detect signal generated from the different sensors which are turned on simultaneously to determine whether having the touch operation, comprises:
reading the detect signal generated from the sensors through the readout lines and storing the detect signal in the detect circuit; and
determining whether the sensors are touched and relative touch locations thereof according to the detect signals.

10. The touch-detecting method as claimed in claim 8, further comprising:
employing the readout lines to charge the sensors to a predetermined voltage.

* * * * *